(No Model.)

C. D. MENEELY.
PROCESS OF MAKING TUBULAR ROLLERS.

No. 473,943. Patented May 3, 1892.

WITNESSES:
John W. Fisher
Grace I. Many

INVENTOR
Charles D. Meneely.
BY
Frederick W. Cameron.
ATTORNEY.

United States Patent Office.

CHARLES DICKINSON MENEELY, OF ALBANY, NEW YORK.

PROCESS OF MAKING TUBULAR ROLLERS.

SPECIFICATION forming part of Letters Patent No. 473,943, dated May 3, 1892.

Application filed November 10, 1891. Serial No. 411,471. (No model.)

*To all whom it may concern:*

Be it known that I, CHARLES DICKINSON MENEELY, a citizen of the United States, residing in the city and county of Albany, State of New York, have invented a new and useful Process of Constructing Tubular Rollers, of which the following is a specification.

My invention relates to metal tubular rollers and processes of manufacturing the same; and the object of my invention is to provide a process of making a tubular roller from a bar of steel or other suitable metal in such a manner that the fiber of the metal shall extend around the tube circumferentially instead of extending along the tube longitudinally, as is common in the manufacture of tubes. I attain this object by means of the process hereinafter described, and illustrated by the accompanying drawings, in which—

Figure 2:
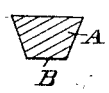
Figure 3:
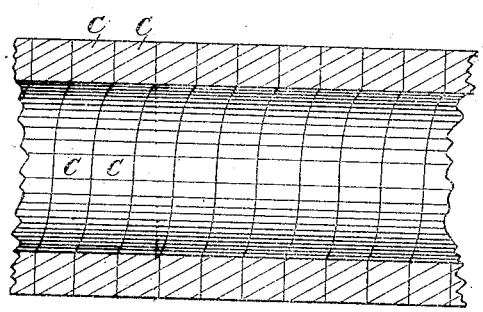
Figure 1:
Figure 4:
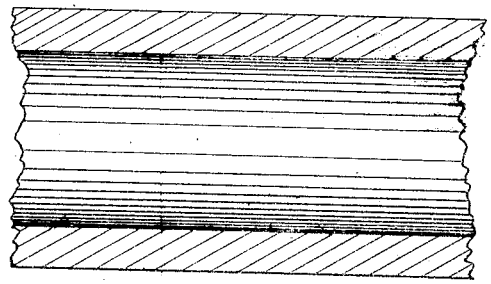

Figure 1 represents a bar of steel, a cross-section of which is trapezoidal in form. Fig. 2 is a cross-section of Fig. 1. Fig. 3 is a longitudinal section of a tubular roller before the spiral portions are welded, and Fig. 4 is a longitudinal section of a tubular roller after the welding process.

Similar letters refer to similar parts throughout the several views.

For the purpose of constructing a tubular roller which shall be able to successfully withstand excessive pressure placed upon it without changing even in a slight degree its circumferential contour I have invented a process of making a tube out of a bar of steel A in which the fiber of the steel shall be drawn around the tube spirally, as shown in Fig. 3, and then welded together by subjecting the tube to heat and applying force to the ends. To accomplish this result I take a piece of metal, usually steel, a cross-section of which is in the form of a trapezoid, (shown in Fig. 2,) place it in contact with a mandrel, having the narrower side B of the two faces of the bar A next to the mandrel, and coil the bar spirally about the mandrel, which will cause a tube to be formed about the mandrel in the form of a coil having the same diameter throughout, with the contiguous faces of the spirals C at right angles to the axis of the tube and in close contact with each other throughout their whole extent. The angles of the trapezoidal bar may be changed in such a manner as to correspond with the changes made in the size of the roller to be formed, it being necessary to form the bar in such a shape that it will assume the form of a tube about the mandrel, having its spirals coinciding and in close contact with each other throughout the whole extent of their lateral faces. The useful result effected by making the bar trapezoidal in form is that when the bar is coiled about the mandrel, the outer face of the bar, having a greater distance to traverse in making the circuit, must be wider than the face that is next to the mandrel, otherwise the contiguous faces of the spirals will not come in contact with each other throughout their whole extent, the result which I wish to obtain. It is apparent that the fiber of the metal will follow the direction of the bar about the mandrel, thus extending around the tube in a spiral direction, affording the very greatest resistance to force or pressure which may be brought in contact with it in the direction of its diameter.

For the purpose of uniting the several spirals C of the tube together in one homogeneous body I apply heat and end pressure to the tube and thus force the ends toward each other, welding the contiguous faces of the spirals C, the spiral sections all uniting, making a perfectly uniform tubular roller.

An important part of my invention is the construction of my tube with its spirals joining each other throughout their whole extent in a line perpendicular to the axis of the roller in such a manner that when pressure is applied at the end of the tube it shall act directly upon all portions of the contiguous surfaces of the spirals, in this respect differing materially from those tubes which have an overlapping connection of the spirals, in which it is impossible to obtain a satisfactory welding by end pressure.

I employ tubular rollers manufactured by the process herein described in roller-bearings used upon railway-cars, where they are obliged to sustain extremely heavy weights and are subjected to the most severe strain occasioned by jolting, sudden, violent, and irregular motions and where it is of the greatest importance that the circumference of the tubular rollers should not vary in their contour, it being a prime requisite that the alignment of the rollers should be perfect.

Great difficulty has been experienced in obtaining rollers for use in roller-bearings which will successfully meet all the requirements demanded of them and at the same time be light enough to be feasible. By my invention a tubular roller is provided which will, when placed in a roller-bearing, sustain its proportion of the heavy weight of a railway-car, together with all the strain incident thereto, without a sufficient alteration in its contour to be indicated by a pair of calipers, even after having been used for some considerable time.

What I claim as my invention, and desire to secure by Letters Patent, is—

The process of constructing a tubular roller, consisting of coiling a trapezoidal-shaped bar about a mandrel, the adjacent faces coinciding with each other throughout their whole extent, applying heat to said coil, and welding the sections of the coil together, substantially as described.

CHARLES DICKINSON MENEELY.

Witnesses:
WALTER E. WARD,
FREDERICK W. CAMERON.